Sept. 17, 1968 R. J. KOERNER ET AL 3,402,398

PLURAL CONTENT ADDRESSED MEMORIES WITH A COMMON SENSING CIRCUIT

Filed Aug. 31, 1964 2 Sheets-Sheet 1

INVENTORS
RALPH J. KOERNER
ALFRED D. SCARBROUGH
BY Arthur Frelich
ATTORNEY

INVENTORS
RALPH J. KOERNER
ALFRED D. SCARBROUGH
BY Arthur Freilich
ATTORNEY

United States Patent Office 3,402,398

Patented Sept. 17, 1968

3,402,398

PLURAL CONTENT ADDRESSED MEMORIES WITH A COMMON SENSING CIRCUIT

Ralph J. Koerner, Canoga Park, and Alfred D. Scarbrough, Northridge, Calif., assignors to The Bunker-Ramo Corporation, Canoga Park, Calif., a corporation of Delaware Filed Aug. 31, 1964, Ser. No. 393,219

10 Claims. (Cl. 340—173)

ABSTRACT OF THE DISCLOSURE

A content addressable memory system utilizing two or more separate memory matrices in order to reduce the amount of selection and sensing equipment required. The memory matrices preferably include an identical number of memory locations. Memory elements of corresponding locations in the matrices are coupled in common to one of a plurality of word sense lines. Each word sense line is connected to one of a plurality of sense stages. Thus, the number of sense stages required is equal to the number of locations in one matrix rather than the total number of locations in the memory.

Figure 1:
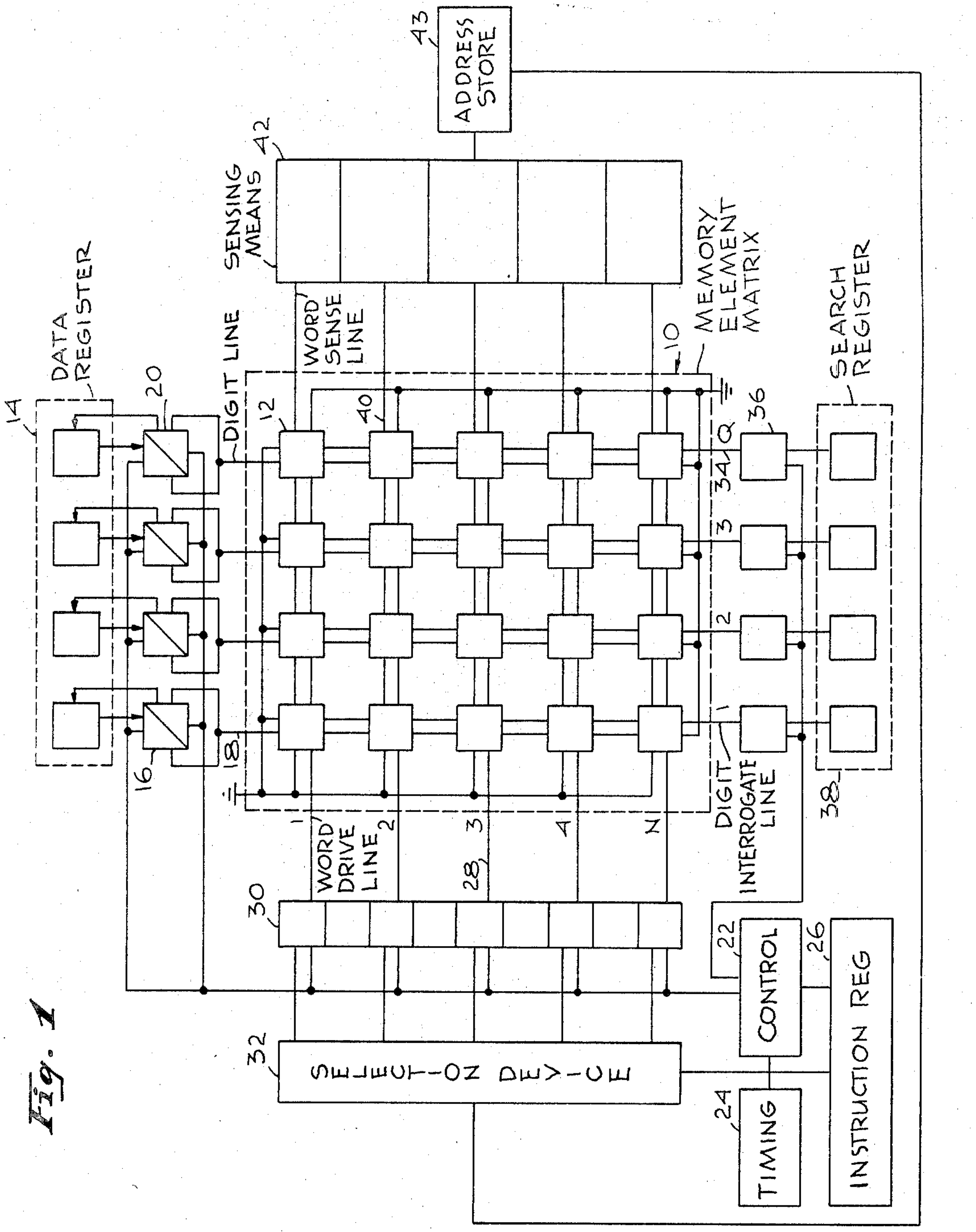

This invention relates generally to digital memories and more particularly to improvements in the organization of content addressable memories.

U.S. Patent No. 3,031,650 discloses some basic content addressable memory implementations and discusses the characteristics which distinguish such memories from conventional digital memories. Briefly, the significant distinguishing characteristic is that each word location in a content addressable memory is not uniquely identified by an address as in conventional digital memories, but instead content addressable memory locations are selected on the basis of information stored therein; i.e., the contents thereof. Hence, the name content addressable memory.

As a result of selecting locations on the basis of stored information, memory search times can be considerably reduced. That is, in situations where it is desired to select those locations, out of N locations in memory, storing words matching a search word, information identifying those locations can be derived in one memory access period instead of the N such periods required by conventional digital memories. More particularly, whereas it is necessary in a conventional digital memory to sequentially access the contents of each location and compare each accessed word with a search word, comparison of the search word with all of the stored words can be simultaneously effected in a content addressable memory.

Essentially, a content addressable memory operates by causing a signal representative of a search word digit to be applied simultaneously to all memory elements storing bits of corresponding significance. Some type of logic means is provided in the memory, such means being operable to generate signals to indicate whether the digits stored in the various memory elements are the same as or different from the corresponding search digit being sought. All elements of a single memory word location are coupled to a common word sense line and by sensing resultant signals appearing on the word sense line, a determination is made as to whether or not the word stored in the memory location associated with the word sense line matches or mismatches the search word.

Whereas the content addressable memory embodiment disclosed in the aforementioned U.S. Patent No. 3,031,650 performs a search which considers all stored digits in parallel, as well as all stored words, U.S. Patent application Ser. No. 269,009 (now Patent No. 3,297,995); filed Mar. 29, 1963, by Ralph J. Koerner and Alfred D. Scarbrough and assigned to the same assignee as the present application, discloses a content addressable memory embodiment which causes the digits of stored words to be considered serially or sequentially, while the words are still considered in a parallel fashion. U.S. patent application Ser. No. 329,405 (now Patent No. 3,292,159), filed Dec. 10, 1963, by Ralph J. Koerner and assigned to the same assignee as the present application, discloses a further content addressable memory embodiment which also considers the digits sequentially but the words in parallel.

Regardless of the details of implementation, most known content addressable memory embodiments are similar to the extent of associating all the storage elements common to each word location with a single word sense line. Also, each of the word sense lines is in turn connected to a different stage of a sensing means. Because each sensing means stage usually includes at least a sense amplifier and some type of commutating circuitry, each stage is relatively expensive and thus the cost of a very large content addressable memory is sometimes prohibitive for the intended application.

In view of this, it is an object of the present invention to provide a content addressable memory system which is considerably less expensive than heretofore known systems having the same word location capacity.

Briefly, the present invention is based on the recognition that a considerable cost reduction can be effected by separating the memory element matrix into at least two portions, each portion including a fraction of the number of full word locations in the memory. Thus, in a memory having N word locations, word locations 1 through $N/2$ can be in a first memory portion and word locations $(N/2)+1$ through N can be in a second memory portion. By associating one word location from each memory portion with each word sense line, the sensing means need only have one-half as many stages as are conventionally required, thereby effecting a considerable cost reduction.

In addition to the reduction in sensing means stages, the number of read and write drivers can be similarly reduced by a factor equal to the numer of memory portions.

Content addressable memories organized in accordance with the present invention are not only considerably less expensive than their conventionally organized counterparts, but, in addition, are more suitable in certain types of applications which involve the processing of data in which related information is contained in more than one word. As an elementary example, consider a table of angles and the trigonometric functions of those angles stored in a content addressable memory. That is, assume a first memory portion stores a different angle in each of its word locations and a second memory portion stores the corresponding sine values in the corresponding word locations of the second memory portion. A search could then be conducted with respect to either the angle or its sine value and the match indication developed as a result of the search could be used to read out both the angle and its sine value. If additional memory portions are provided, they can be used to store the other trigonometric functions and thus as a result of a single search, all of the locations storing related words can be accessed to either read them or write new information therein.

Figure 2:
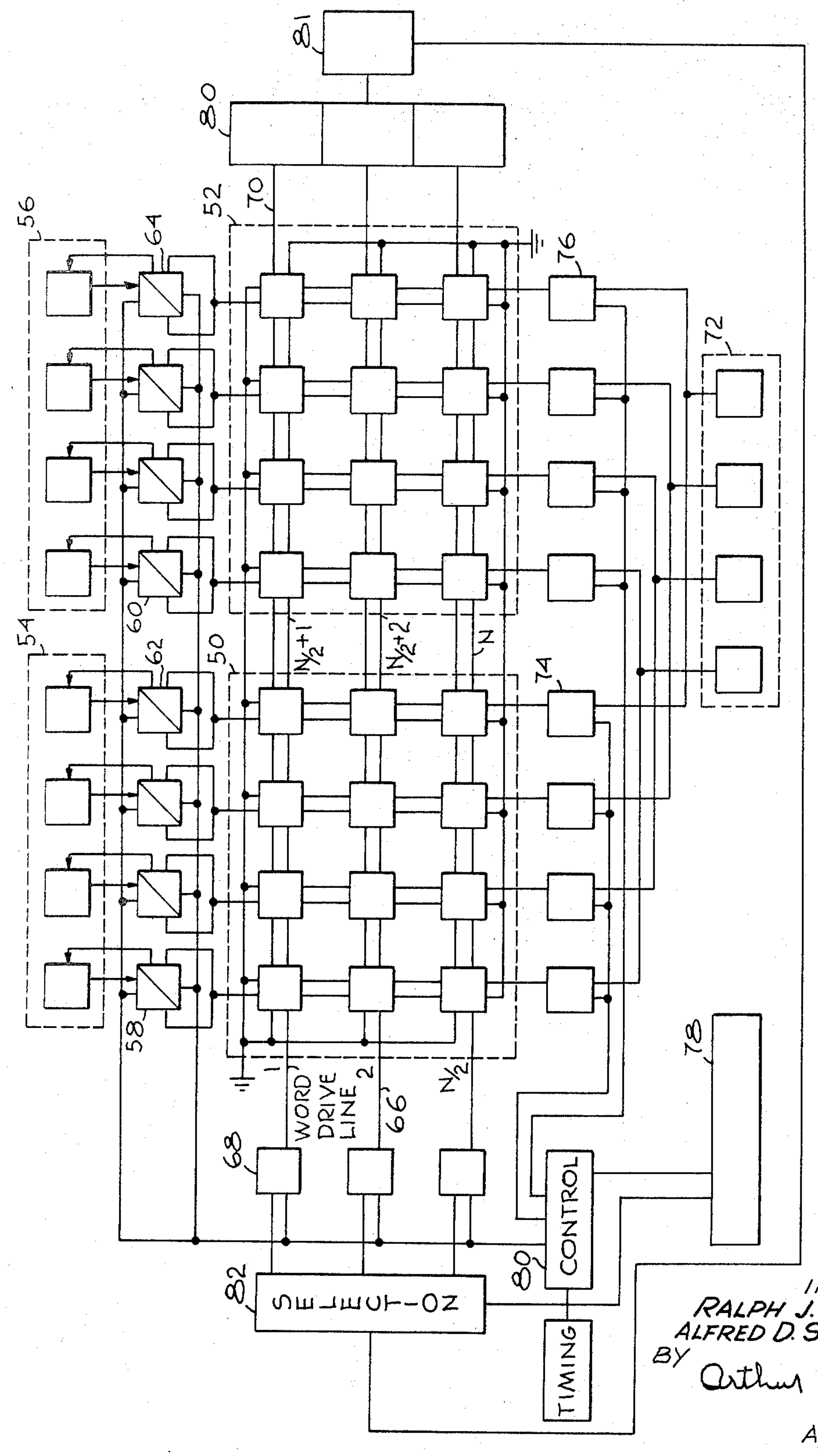

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of a conventionally organized content addressable memory system; and FIGURE 2 is a block diagram of a content addressable memory system organized in accordance with the present invention.

Attention is now called to FIGURE 1 of the drawings which shows a block diagram of a substantially conventionally organized content addressable memory system. The content addressable memory system of FIGURE 1 can be used with a digital computer or other data processing apparatus in a data processing system. The block diagram of FIGURE 1 is intended to represent the organization of a system rather than any particular implementation. Various implementations are in fact known as exemplified by the aforecited U.S. patent and patent applications.

Generally speaking, the conventional content addressable memory system includes a memory element matrix 10 which is comprised of a plurality of memory elements 12 arranged to define a plurality of word locations. It will be assumed that the matrix 10 of FIGURE 1 includes N word locations, each location comprised of Q memory elements. The aforecited U.S. patent and patent applications illustrate content addressable memory implementations in which the memory elements 12 comprise multiple aperture magnetic cores or flip-flop circuits with appropriate gating circuitry. It is pointed out, however, that many other types of memory elements could be utilized in the matrix 10 and the invention herein is applicable to all known implementations and should not be understood as being restricted to the implementations referred to.

More particularly, the matrix 10 of FIGURE 1 includes a plurality of memory elements 12 arranged in N rows and Q columns, thereby providing an N word storage capacity, each word being comprised of Q digits.

A data register 14 including Q stages is provided for storing information to be entered into the memory or information which is read from the memory. The data register 14 is intended to communicate with a computer or other portions of a data processing system (not shown). The output of each stage of the data register 14 is connected to the input of a different digit driver 16 whose output in turn is connected to a different digit line 18. Each of the digit lines 18 is associated with all of the memory elements 12 in a different column in the matrix 10. Inasmuch as the illustrated matrix of FIGURE 1 is intended to represent many different possible implementations, the detailed coupling between the digit line 18 and each of the memory elements in the matrix column associated therewith is not illustrated. However, from what will be said hereinafter regarding the function of the digit line 18, the appropriate coupling for the particular type memory element employed should be readily apparent to one skilled in the art.

Each of the digit lines 18 is also connected to the input of a different sense amplifier 20 whose output is connected to the input of a different stage of the data register 14. The digit drivers 16 and the sense amplifiers 20 are controlled by the output of control means 22 which is responsive to a timing source 24 and an instruction stored in a register 26.

A different word drive line 28 is associated with all of the elements of a different one of the matrix rows. Each of the owrd drive lines 28 is connected to the output of a word line driver 30 which is also controlled by the control means 22. A selection device 32 is connected to the instruction register 26 and responsive thereto for selecting one of the drivers 30.

When information is to be entered into a selected word location of the N word locations in the matrix 10, an appropriate instruction is entered into the register 26 which identifies the matrix location so as to permit the appropriate word line driver 30 to develop a signal at its output which thus enables information to be written into or read from the memory elements associated therewith. That is, if the digit drivers 16 are enabled by the control means 22, the information stored in the data register 14 will be applied to the digit lines 18 and will be written into the elements of the memory location associated with the driver 30 providing an output pulse. On the other hand, if the sense amplifiers are enabled, the pulse concurrently applied to the word drive line will cause the information stored in the associated word location to provide signals on the digit lines 18 which are sensed by the amplifiers 20 and stored in the data register 14. Memories of this type in which a location can be accessed by providing an appropriate pulse to the corresponding word drive line are usually referred to as word organized or linear select type memories.

The difference between the matrix 10 which is suitable for use in a content addressable memory and a standard matrix which is used in conventional linear select memories is that the content addressable matrix 10 effectively has distributed logic which permits an exclusive or logical operation or a comparison function to be performed at each memory element. As noted, the manner in which this operation is performed depends upon the particular implementation of the content addressable memory matrix; examples of such implementations are disclosed in the aforecited U.S. patent and patent applications.

In most known content addressable memory implementations, Q digit interrogate lines 34 are provided, each of which is associated with all of the elements of a different one of the matrix columns. Each of the digit interrogate lines 34 is connected to the output of a different driver 36 which is controlled by the control means 22 and is responsive to a different stage of a search register 38.

In operation, in order to conduct a search to determine whether a word stored in one of the memory locations matches a search word, the search word is entered into the search register 38. The control means 22 then enables the drivers 36 to cause interrogation signals to be developed on each of the digit interrogate lines 34. Generally, mismatch signals are developed at each memory element in the event the digit stored thereby does not match the corresponding search word digit repersented by the interrogation signal. The mismatch signal developed at each memory element is applied to a word sense line 40. N word sense lines 40 are provided and each is associated with all of the elements of a different one of the matrix rows. Each of the word sense lines 40 is connected to a different stage of a sensing means 42. Each stage of the sensing means 52 is usually initially set to a match indicating state and assumes a mismatch indicating state in response to the subsequent development of a mismatch signal on the word sense line 40 connected thereto. In the event no mismatch signals appear on a particular word sense line 40, the sensing means stage connected thereto, will define a match indicating state at the completion of a search.

The sensing means 42 can, for example, be of the type disclosed in U.S. patent application Ser. No. 296,001 (now Patent No. 3,311,881), filed July 18, 1963 by Robert N. Mellott entitled "Selection Device" and assigned to the same assignee as the present application. That is, as disclosed in that application, the sensing devices can be responsive to the development of mismatch signals on the word sense lines. The commutating apparatus provided permits the sensing means stages defining a match indicating state to be sequentially selected to develop address signals identifying the memory locations storing words matching the search word. These address signals can be stored by an address store 43 and then used in different manners, as for example by the selection device 32, to permit new information to be read into the locations storing matching words or read out the information stored in those locations. It is worth pointing out that searches in a content addressable memory need not be conducted with respect to the full word but can be conducted with respect to portions of the search word (as by masking the unwanted portions). Thus, where match indications are developed on the basis of portions of a full word, it is sometimes desirable to read out the full word and the address signals developed by the sensing means 42 can be utilized by the selection device 32 for this purpose.

It is to be noted in the conventionally organized content addressable memory system of FIGURE 1 that one sensing means stage is provided for each word location in the memory element matrix. Similarly, one driver 30 is provided for each word location in the matrix. Due to the high cost of the sensing means stages and the drivers 30, the total cost of a content addressable memory system having a very large capacity is sometimes prohibitive.

In order to considerably reduce the cost of content addressable memory systems and thus make their use much more practicable, an improved system organization is disclosed herein as illustrated in FIGURE 2. Making the assumption that it is still desirable that the memory system have a capacity of N words where each word includes Q bits, the system of FIGURE 2 employs M (herein, 2) memory matrices 50 and 52. Matrix 50 includes word location 1 through $N/2$ and matrix 52 includes word locations $(N/2)+1$ through N. Data registers 54 and 56 are respectively coupled to the matrices 50 and 52 through sets of digit drivers 58 and 60 and sets of sense amplifiers 62 and 64.

Instead of providing N word drive lines as shown in FIGURE 1, $N/2$ word drive lines 66, each being connected to the output of a different driver 68, are provided. Each of the word drive lines 66 is coupled to all of the elements of one word location in each of the matrices 50 and 52. Similarly, each of the word sense lines 70 is coupled to all of the elements in one location in each of the matrices 50 and 52. A search register 72 is connected to the inputs of first and second sets of drivers 74 and 76.

An instruction entered into an instruction register 78 causes control means 80 to enable either the drivers 74 or the drivers 76 when a search is to be conducted. As a consequence, a search word stored in the search register 72 will be compared with all of the words stored in either the matrix 50 or the matrix 52. The mismatch signals developed on the word sense lines 70 will be applied to the stages of sensing means 80, there being only $N/2$ such stages required.

As a consequence of providing a plurality of smaller matrices of memory elements in accordance with the invention, the cost of a content addressable memory system having a large capacity can be considerably reduced. For example, consider the practical situation in which the system has a one thousand word capacity where each word includes thirty bits. By constructing the system in accordance with the invention as illustrated in FIGURE 2, five hundred word line drivers 68 are eliminated and five hundred stages of the sensing means 80 are also eliminated. Only thirty additional digit interrogate drivers 76, thirty additional sense amplifiers 64, thirty additional digit drivers 60, and an additional thirty stage data register 56 are required. In larger capacity memories, even greater hardware savings are effected. It should also be appreciated that by separating the total number of word locations into even more than two matrices, a still greater hardware reduction can be achieved.

Admittedly, by providing a plurality of matrices in accordance with the invention as shown in FIGURE 2, as distinguished from FIGURE 1, memory search times will be somewhat increased in the situation where the entire memory has to be searched for a search word. As a practical matter, however, many applications exist in which the system programmer is able to generally keep track of information and thus does not often need to search through the entire memory. For example, consider the aforecited elementary situation in which angles and the trigonometric sine functions thereof are stored in the memory. Let the angles be stored in the locations of the matrix 50 and the corresponding values of the sine function be stored in the locations of the matrix 52. Assume that the search word represents an angle and the value of the sine function corresponding to that angle is desired. Inasmuch as the system programmer would more than likely know that the angle information was stored in the matrix 50, the instruction entered into the register 78 could therefore enable the set of drivers 74 to compare the angle information stored in the search register 72 with the words in matrix 50. The address signals developed by the sensing means 80 could thereafter be used by the selection device 82 to readout the angle and the corresponding value of the sine function into the data registers 54 and 56.

From the foregoing, it should be appreciated that an improved content addressable memory organization has been disclosed herein which permits the cost of large content addressable memory systems to be considerably reduced at a generally nominal sacrifice in operating characteristics. The cost saving is essentially effected by using the same set of word line drivers and sensing means stages for more than one memory element matrix.

It is reiterated that the details of implementation of a content addressable memory system have not been illustrated herein inasmuch as the teachings of the invention are equally applicable to all known systems and further because such implementation details for performing a search are adequately covered in the aforecited patent and patent applications. The means for writing information in and reading information from a location in a word organized or linear select memory is likewise well documented in many patents and texts.

It is further pointed out that the reference made to matching between a search word and a stored word should not be understood as necessarily implying an exact match but rather, a match within the limits of defined criteria. Thus, as discussed in the aforecited patent applications, a criterion such as "greater than or equal to" can be defined. It is also pointed out that, although for the sake of clarity, the search registers 38 in FIGURE 1 and 72 in FIGURE 2 are illustrated as being separate and distinct registers, they are intended only to represent a means for storing a search word. An alternative approach is disclosed in the aforecited U.S. patent application Ser. No. 329,405 in which the search word is stored in one of the memory locations.

The embodiments of the invention in which an exclusive property or privilege is claimed are defined as follows:

1. In a content addressable memory system:

a first matrix comprised of a plurality of memory elements arranged to define a plurality of word locations;

a second matrix comprised of a plurality of memory elements arranged to define a plurality of word locations;

a plurality of word sense lines, each associated with all of the elements of one word location in said first matrix and one word location in said second matrix;

a search register storing a search word comprised of a plurality of digits;

means for identifying a selected one of said matrices;

means for generating interrogation signals respectively representative of different search word digits and for coupling each of said signals simultaneously to all of the corresponding memory elements in said selected memory matrix;

means associated with each of said memory elements and responsive to said interrogation signals for providing a manifestation on the word sense line associated therewith indicating whether or not the digit stored by the memory element matches the search word digit represented by the corresponding interrogation signal; and sensing means including a plurality of stages, each stage connected to a different one of said word sense lines.

2. A memory system comprising:

a first matrix of memory elements respectively including $N/2$ rows of elements, each row comprising a memory location capable of storing a word, and Q columns of elements, each column including a correspondingly positioned memory element from each location;

a second matrix of memory elements respectively including $N/2$ rows of elements, each row comprising a memory location capable of storing a word, and Q columns of elements, each column including a correspondingly positioned memory element from each location;

a plurality of word sense lines, each of which is associated with all of the elements of one location in said first matrix and one location in said second matrix;

a first plurality of digit lines each of which is associated with all of the elements of a different one of said first matrix columns;

a second plurality of digit lines each of which is associated with all of the elements of a different one of said second matrix columns Q storage elements;

first driver means selectively energizable to apply interrogation signals to said first plurality of digit lines, each such signal respectively representative of the state of a different one of said Q storage elements;

second driver means selectively energizable to apply interrogation signals to said second plurality of digit lines, each such signal respectively representative of the state of a different one of said Q storage elements;

means associated with each of said memory elements and responsive to said interrogation signals for providing a manifestation on the word sense line associated therewith indicating whether or not the state of the memory element matches the state represented by the corresponding interrogation signal; and sensing means including a plurality of stages, each stage connected to a different one of said word sense lines.

3. The system of claim 2 including:

a plurality of word drive lines each of which is associated with the same memory elements as a different one of said word sense lines;

a first plurality of digit sense lines, each of which is associated with all of the elements of a different one said first matrix columns;

a second plurality of digit sense lines, each of which is associated with all of the elements of a different one of said second matrix columns;

a first data register;

a second data register; and means respectively connecting said first data register to said first plurality of digit sense lines and said second data register to said second plurality of digit sense lines.

4. In a content addressable memory system including a plurality of memory elements arranged to define N word locations, each location including Q memory elements thereby enabling each location to store a word comprised of Q digits, the improvement comprising:

a first group of said memory elements including $N/2$ word locations, each location including Q memory elements;

a second group of said memory elements including $N/2$ word locations, each location including Q memory elements;

a sensing means including $N/2$ stages, each stage being associated with one word location in each of said first and second groups of memory elements and being capable of defining a match indicating state and a mismatch indicating state;

means defining a search word;

comparing means for comparing said search word with all of the words stored in either said first or second group of memory elements; and means responsive to said comparing means for causing said sensing means stages to define a match indicating state in the event either of the words stored in the locations associated therewith match said search word.

5. The system of claim 4 including:

first and second data register means respectively associated with said first and second groups of memory elements;

selection means for identifying one location in each of said first and second groups, said selection means including $N/2$ stages, each stage being associated with the same locations as a different one of said sensing means stages; and control means for selectively energizing said selection means for transferring information between said first data register and said location identified in said first group of memory elements and said second data register and said location identified in said second group of memory elements.

6. The system of claim 5 wherein said sensing means includes means for providing address signals identifying said stages defining a match indicating state; and wherein said selection means is responsive to said address signals.

7. In a content addressable memory system capable of storing N words, each word comprised of Q bits, an improved system organization comprising:

M groups of memory elements, each group including $N/M$ word locations, each location including Q memory elements;

a sensing means including $N/M$ stages, each stage being associated with one word location in each of said M groups and being capable of defining a match indicating state and a mismatch indicating state;

means defining a search word;

comparing means for comparing said search word with all of the words stored in one of said M groups; and means responsive to said comparing means for causing said sensing means stages to define a match indicating state in the event any of the words stored in the locations associated therewith match said search word.

8. In a content addressable memory system capable of storing N words, each word comprised of Q bits, an improved system organization comprising:

M groups of memory elements, each group including $N/M$ word locations, each location including Q memory elements;

a sensing means including $N/M$ stages, each stage being associated with one word location in each of said M groups and being capable of defining a match indicating state and a mismatch indicating state;

means defining a search word;

means for selectively identifying one of said M groups of memory elements;

comparing means for comparing said search word with all of the words stored in said identified one of said M groups; and means responsive to said comparing means for causing said sensing means stages to define a match indicating state in the event the word stored in the location associated therewith in the identified one of said M groups, matches said search word.

9. The system of claim 8 including:

M data register means each respectively associated with a different one of said M groups of memory elements;

selection means for identifying one location in each of said M groups, said selection means including $N/M$ stages, each stage being associated with the same locations as a different one of said sensing means stages; and control mean for selectively energizing said selection means for transferring information between each of said data register means and the identified location in the associated one of said M groups of memory elements.

10. The system of claim 9 wherein said sensing means includes means for providing address signals identifying said stages defining a match indicating state; and wherein said selection means is responsive to said address signals.

References Cited

UNITED STATES PATENTS

| | | | |
|---|---|---|---|
| 3,230,512 | 1/1966 | Seeber | 340—173 |
| 3,284,775 | 11/1966 | Koerner et al. | 340—173 |
| 3,290,661 | 12/1966 | Belcourt | 340—173 |

TERRELL W. FEARS, *Primary Examiner.*